(No Model.)
H. B. GLEASON.
WHEEL.
No. 528,125. Patented Oct. 23, 1894.
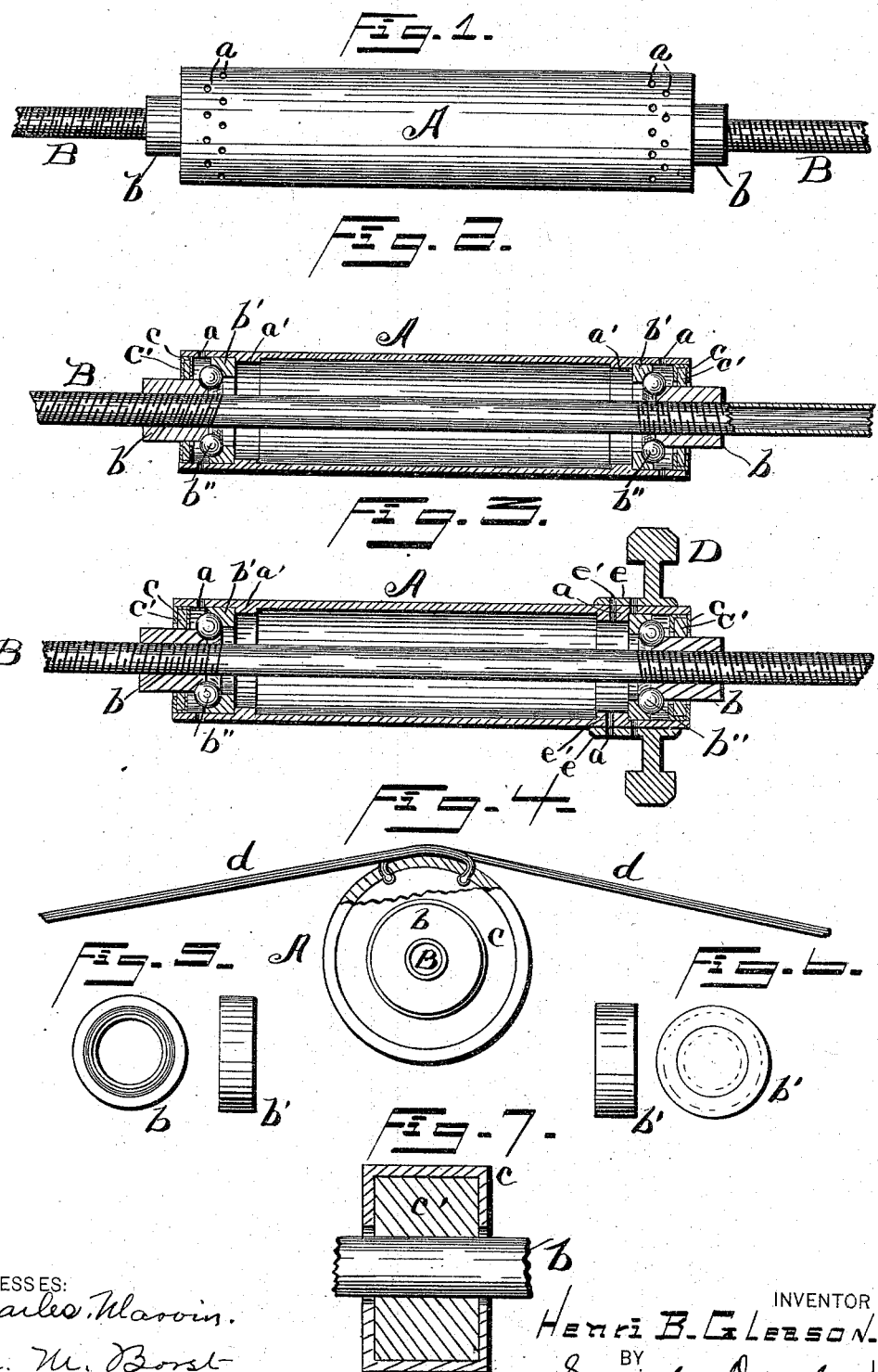

UNITED STATES PATENT OFFICE.

HENRI B. GLEASON, OF ONEIDA, NEW YORK.

WHEEL.

SPECIFICATION forming part of Letters Patent No. 528,125, dated October 23, 1894.

Application filed November 11, 1893. Serial No. 490,639. (No model.)

*To all whom it may concern:*

Be it known that I, HENRI B. GLEASON, of Oneida, in the county of Madison, in the State of New York, have invented new and useful Improvements in Wheels, of which the following, taken in connection with the accompanying drawings, is a full, clear, and exact description.

My invention relates to vehicle wheels.

My object is to produce an improved vehicle wheel, particularly as to the connection of the spokes to the hub, in such manner that they are partly circumferential, and then become tangential through divergence; also as to the construction of the hub without exterior rings or ribs to which the spokes can be connected, but so constructing it that they are connected directly to the body of said hub; also in securing the driving sprocket to the hub-body by the spokes inserted through the hub of the sprocket and the wheel hub-body; also reinforcing the wheel hub-body by the inward elongations of the sprocket hub; also in providing a dust-band case inclosing a felt dust-band ring through which the axle-nut passes.

My invention consists in the several novel features of construction and operation hereinafter described and which are specifically set forth in the claims hereunto annexed. It is constructed as follows, reference being had to the accompanying drawings, in which—

Figure 1, is a front elevation of a hub for the front wheel of a cycle. Fig. 2, is a longitudinal vertical section of the same. Fig. 3, is a like view of a hub for the rear wheel of a cycle. Fig. 4, is a sectional elevation of the end of a hub, showing the mode of attaching the spokes to the hub. Fig. 5, is a front elevation and also an edge view of the removable ball race, inserted into the hub as a part of the ball bearing. Fig. 6, is a rear elevation and an edge view of the same. Fig. 7, is a sectional elevation, on an enlarged scale, of the dust-band case and the felt dust-band therein fitting closely around the axle.

A— is the body of the hub, consisting of a metallic cylinder, open at the ends, provided with the spoke holes —$a$—, and interiorly with the shoulders —$a'$— secured therein or integral therewith.

B— is the axle, solid or tubular, threaded to receive nuts —$b$— concaved upon their inner ends to form one member of the ball bearing, of which the ring —$b'$— is the other member, the balls —$b''$— having their bearings in said rings and nuts, and being adjusted by means of said nuts.

A dust-band case —$c$— is inserted into the ends of the hub-body, and is adapted to receive and hold, the dust-band proper —$c'$— consisting of felt, cloth, fiber, or analogous close and elastic or resilient material which fits onto and around the periphery of each nut, with close frictional contact.

The spokes —$d$— are inserted through the holes —$a$— in the hub until their heads bear against its body, and are then first bent to lie upon the periphery of said hub, and then to diverge tangentially therefrom.

D— is the sprocket-wheel, or gear, having its hub elongated inwardly as at —$e$— and secured on to the body of the hub (as for the rear or driven wheel of a cycle) and secured by rivets inserted through holes —$e'$—, or by the spokes inserted through it, through the holes —$a$— and —$e''$—, or both; said hub elongation reinforcing the hub-body against breakage, or torsional twisting, incident to the strain upon the sprocket in driving the wheel.

The nuts can be made shorter, so that the dust-band will bear directly upon the axle.

What I claim as my invention, and desire to secure by Letters Patent, is—

1. A vehicle hub, comprising a cylindrical body, shouldered interiorly, in combination with an axle, ball bearings therein, nuts upon the axle, and a dust-band comprising an annular-ring case and a felt dust-band within it inserted into the ends of said body.

2. In a vehicle wheel, the combination with the hub-body of spokes inserted through it, and bent to lie upon its periphery and thereafter to diverge therefrom tangentially.

3. A hub comprising a cylindrical body, shoulders within it, rings within it bearing against said shoulders, an axle through the hub, nuts upon said axle, balls between and having their bearings upon said rings and nuts, and a dust band consisting of an annular-ring case, and an annular ring of felt held in said case and projecting interiorly beyond it, in combination.

In witness whereof I have hereunto set my hand this 6th day of November, 1893.

HENRI B. GLEASON.

In presence of—
C. W. SMITH,
HOWARD P. DENISON.